United States Patent
Collet

(10) Patent No.: US 11,619,195 B2
(45) Date of Patent: Apr. 4, 2023

(54) DETECTION OF LEAKS IN A DEVICE FOR EVAPORATING VAPORS OF A FUEL STORED IN A VEHICLE HEAT ENGINE TANK

(71) Applicants: CONTINENTAL AUTOMOTIVE FRANCE, Toulouse (FR); CONTINENTAL AUTOMOTIVE GMBH, Hanovre (DE)

(72) Inventor: Thierry Collet, Toulouse (FR)

(73) Assignees: VITESCO TECHNOLOGIES GMBH, Regensburg (DE); CONTINENTAL AUTOMOTIVE GMBH, Hannover (DE)

( * ) Notice: Subject to any disclaimer, the term of this patent is extended or adjusted under 35 U.S.C. 154(b) by 267 days.

(21) Appl. No.: 16/978,061

(22) PCT Filed: Feb. 8, 2019

(86) PCT No.: PCT/HR2019/050283
§ 371 (c)(1),
(2) Date: Sep. 3, 2020

(87) PCT Pub. No.: WO2019/170973
PCT Pub. Date: Sep. 12, 2019

(65) Prior Publication Data
US 2021/0040919 A1 Feb. 11, 2021

(30) Foreign Application Priority Data
Mar. 8, 2018 (FR) ........................................ 1852023

(51) Int. Cl.
*F02M 25/08* (2006.01)
*B60K 15/035* (2006.01)
*B60K 15/03* (2006.01)

(52) U.S. Cl.
CPC ... *F02M 25/0818* (2013.01); *B60K 15/03504* (2013.01); *F02M 25/089* (2013.01);
(Continued)

(58) Field of Classification Search
CPC .......... F02M 25/0818; F02M 25/0809; F02M 25/0836; F02M 25/089; B60K 2015/0348;
(Continued)

(56) References Cited

U.S. PATENT DOCUMENTS 5,146,902 A * 9/1992 Cook ................. F02M 25/0818
73/114.38
5,868,120 A * 2/1999 Van Wetten ..... B60K 15/03504
123/518
(Continued)

FOREIGN PATENT DOCUMENTS

CN 1573071 A 2/2005
CN 1774571 A 5/2006
(Continued)

OTHER PUBLICATIONS

International Search Report and Written Opinion of the ISA for PCT/FR2019/050283, dated Apr. 10, 2019, 13 pages.
(Continued)

*Primary Examiner* — Phutthiwat Wongwian
*Assistant Examiner* — Susan E Scharpf
(74) *Attorney, Agent, or Firm* — Nixon & Vanderhye

(57) ABSTRACT

Disclosed is a device for evaporating vapors of a fuel stored in a motor vehicle tank. The evaporation device includes a bypass circuit and a bypass valve configured to move between a so-called "absorption" position, in which the bypass valve allows the gases to flow between the tank and an absorbent filter and a so-called "leak detection" position, in which the bypass valve allows the gases to flow between a purge circuit and the tank via the bypass circuit.

20 Claims, 2 Drawing Sheets

(52) U.S. Cl.
CPC .... *F02M 25/0809* (2013.01); *F02M 25/0836* (2013.01); *B60K 2015/0348* (2013.01); *B60K 2015/03514* (2013.01)

(58) Field of Classification Search
CPC ... B60K 2015/03514; B60K 15/03504; G01M 3/025; G01M 3/3272
See application file for complete search history.

(56) References Cited

U.S. PATENT DOCUMENTS

| | | | | |
|---|---|---|---|---|
| 5,967,124 A * | 10/1999 | Cook | | F02M 25/0818 123/198 D |
| 5,975,062 A * | 11/1999 | Bonse | | F02M 25/0818 123/519 |
| 6,119,663 A * | 9/2000 | Okuma | | F02M 25/0818 123/198 D |
| 6,182,642 B1 * | 2/2001 | Ohkuma | | F02M 25/0818 123/519 |
| 6,993,957 B2 * | 2/2006 | Kano | | F02M 25/0818 73/49.7 |
| 7,077,112 B2 | 7/2006 | Mitani et al. | | |
| 7,219,535 B2 * | 5/2007 | Hosoya | | F02M 25/0818 73/49.7 |
| 7,313,487 B2 * | 12/2007 | Yoshioka | | F02M 25/0809 702/51 |
| 8,739,766 B2 | 6/2014 | Jentz et al. | | |
| 8,746,215 B2 | 6/2014 | Perry et al. | | |
| 9,212,633 B2 * | 12/2015 | Haag | | G01M 3/3263 |
| 10,156,208 B2 | 12/2018 | Kishi et al. | | |
| 10,184,430 B2 | 1/2019 | Watanabe et al. | | |
| 10,526,984 B2 * | 1/2020 | Wakamatsu | | F02M 25/08 |
| 2002/0066440 A1 * | 6/2002 | Kano | | F02M 25/089 123/520 |
| 2003/0226549 A1 * | 12/2003 | Takagi | | F02M 25/0818 73/114.38 |
| 2004/0112119 A1 * | 6/2004 | Watanabe | | F02M 25/0836 73/40 |
| 2004/0173013 A1 * | 9/2004 | Kobayashi | | F02M 25/0818 73/40.5 R |
| 2005/0000273 A1 | 1/2005 | Hosoya | | |
| 2011/0011264 A1 * | 1/2011 | Makino | | F02M 25/0872 96/144 |
| 2013/0297177 A1 * | 11/2013 | Kim | | F02D 41/22 701/102 |
| 2014/0095049 A1 * | 4/2014 | Jentz | | F02M 65/00 701/101 |
| 2014/0102421 A1 | 4/2014 | Kato | | |
| 2014/0277927 A1 * | 9/2014 | Guo | | F02M 25/0818 701/34.4 |
| 2015/0046026 A1 * | 2/2015 | Pearce | | G07C 5/00 701/33.9 |
| 2017/0030302 A1 * | 2/2017 | Takezawa | | F02M 25/089 |
| 2017/0030303 A1 * | 2/2017 | Takakura | | F02M 25/0809 |
| 2017/0260930 A1 | 9/2017 | Weigl et al. | | |
| 2017/0276078 A1 * | 9/2017 | Imaizumi | | F02M 25/089 |
| 2020/0072166 A1 * | 3/2020 | Honda | | F02M 25/0836 |

FOREIGN PATENT DOCUMENTS

| | | |
|---|---|---|
| CN | 102913346 A | 2/2013 |
| CN | 103109067 A | 5/2013 |
| CN | 104641099 A | 5/2015 |
| CN | 106068379 A | 11/2016 |
| CN | 106257036 A | 12/2016 |
| CN | 107709745 A | 2/2018 |
| CN | 107709747 A | 2/2018 |
| DE | 198 29 423 | 1/2000 |
| DE | 10 2009 036263 | 2/2011 |
| JP | H08-240162 A | 9/1996 |
| TW | 200419066 A | 10/2004 |

OTHER PUBLICATIONS

Office Action issued in Chinese Patent Application No. 201980017701.7 dated Aug. 18, 2021.

* cited by examiner

DETECTION OF LEAKS IN A DEVICE FOR EVAPORATING VAPORS OF A FUEL STORED IN A VEHICLE HEAT ENGINE TANK

This application is the U.S. national phase of International Application No. PCT/FR2019/050283 filed 8 Feb. 2019, which designated the U.S. and claims priority to FR Patent Application No. 1852023 filed 8 Mar. 2018, the entire contents of each of which are hereby incorporated by reference.

BACKGROUND OF THE INVENTION

Field of the Invention

The invention relates to the field of the control of leaks in a device for evaporating gases in a vehicle heat engine fuel tank.

The invention aims in particular to allow the detection of a leak of fuel vapors in a motor vehicle with a heat engine, both when the engine is running and when it is switched off.

Description of the Related Art

As is known, a vehicle heat engine comprises hollow cylinders each delimiting a combustion chamber into which a mixture of air and fuel is introduced. This mixture is compressed in the cylinder by a piston and then ignited so as to make the piston move in translation inside the cylinder. The movement of the pistons in each cylinder of the engine causes a drive shaft known as the "crankshaft" to rotate, making it possible, via a transmission system, to drive the wheels of the vehicle in rotation.

In such a vehicle, the fuel, which is stored in a tank, is first drawn from said tank by a so-called "injection" pump that conveys it into a likewise so-called "injection" rail, where the fuel is pressurized. The fuel is introduced into the combustion chamber of a cylinder by an injector, which is connected to the injection rail and to said combustion chamber and is controlled by a so-called "engine control" computer. The fuel tank, the injection pump, the injection rail and the fuel injectors form what is known as the fuel intake system of the vehicle.

The fuel stored in the tank requires an opening to the fresh air so that the vapors emitted can exit and air can enter when the fuel level decreases. It is thus necessary to regulate the pressure of the gases contained in the tank in order to avoid large pressure variations that could cause both material damage and personal injury. To this end, a known solution consists of forming an exhaust orifice in the closure cap of the tank in order to discharge these gas vapors directly to the outside of the vehicle. Such release of these fuel vapors into the atmosphere has the major drawback of significantly polluting the environment. Such releases are now becoming increasingly less desirable and possible in light of various laws, which are becoming increasingly restrictive in this respect and some of which require a drastic limitation of the emission of fuel vapors into the atmosphere.

In order to limit pollution, it is thus nowadays known practice to install a gas evaporation device in the fuel intake system of the vehicle. Such an evaporation device is connected to the tank and to the outside of the vehicle. In a known solution, this evaporation device comprises a carbon degassing filter referred to hereinafter as an "absorbent filter" (commonly described as a "canister" by a person skilled in the art) that makes it possible to absorb the fuel vapors coming from the tank so that the gases discharged into the atmosphere by the evaporation device are significantly purified of the polluting components contained in the fuel vapors.

However, such an absorbent filter has a limited absorption capacity and requires regular purging. To this end, the evaporation device is also connected to the engine of the vehicle so as to allow the injection of the gases absorbed by the filter directly into the combustion chambers of the running engine so that they can be burned therein. In other words, the absorbent filter is regularly loaded by the fuel vapors coming from the tank, and then unloaded into the cylinders of the running engine.

To this end, in a known solution illustrated in FIG. 1, the device 3 for evaporating fuel vapors comprises a so-called "absorption" circuit 32, connecting the tank 2 to the absorbent filter 31, and a so-called "purge" circuit 33 connecting the absorbent filter 31 to the engine 1 of the vehicle. The absorbent filter 31 is also connected to a so-called "ventilation" circuit 35 so as to allow the gases to flow from the tank 2 to the outside, via the absorbent filter 31, thus allowing the absorbent filter 31 to capture the gases emitted by the fuel stored in the tank 2. A purge valve 34, incorporated into the purge circuit 33 and controlled by an engine control computer 4 of the vehicle, makes it possible to purge the gases stored in the absorbent filter 31 and inject them into the cylinders of the engine 1.

However, in such an evaporation device 3, the presence of leaks must be controlled so as to limit the release of pollutants into the atmosphere. To this end, still with reference to FIG. 1, the evaporation device 3 comprises an outlet valve 30, incorporated into the ventilation circuit 35 and controlled by the computer 4, making it possible, in the closed position, to isolate the evaporation device 3, i.e. making it possible to isolate the absorption circuit 32 and the purge circuit 33 from the outside. Opening the purge valve 34 and the outlet valve 30 makes it possible, by means of an electric pump 36, to draw in the gases contained in the tank 2 and the absorbent filter 31 to convey them to the cylinders of the engine 1 in order to create the evacuation of the evaporation device 3.

Once the evaporation device 3 has been evacuated, the purge valve 34 is also closed and the pressure prevailing in the purge circuit 33, known as the internal pressure, together with the temperature, are then measured by means of a pressure sensor 37 and a temperature sensor 38. When no leaks are present in the evaporation device 3, the pressure and temperature remain stable. Conversely, in the presence of a leak in the evaporation device 3, the pressure sensor 37 allows the computer 4 to detect a pressure increase in the gases in the evaporation device 3, which is synonymous with a leak.

However, in order to generate the vacuum in the evaporation device 3, the engine must be running to burn the toxic vapors coming from the tank 2 via the absorbent filter 31 (but without having been filtered). In addition, to carry out the pressure and temperature measurements, the vehicle must be stationary. The times when the vehicle is stationary and the engine is running (so-called "idling" speed) for long enough to carry out the leak test are increasingly few during the use of a vehicle, particularly due to hybrid engines and so-called "Start&Stop" systems, which therefore poses a significant drawback.

In order to at least partially overcome this drawback, it is known practice to use an evaporation device in which the outlet valve 30 is a piece of equipment known as NVLD (Natural Vacuum Leak Detection) equipment, which makes it possible to detect a leak in the evaporation device even when the engine of the vehicle is switched off. This piece of equipment includes a valve, in which is mounted a solenoid allowing the detection of a leak in the evaporation device, and a so-called "smart" sensor known as a Smart Device, mounted on the tank to measure in particular the pressure and temperature of the gases in the fuel tank. Such a piece of equipment however has the drawbacks of being costly while making the architecture of the evaporation device more complex, which can in particular make it difficult to install as standard on any type of vehicle.

BRIEF SUMMARY OF THE INVENTION

The invention therefore aims to at least partially overcome these drawbacks by proposing a simple, reliable, effective and low-cost solution that makes it possible to detect a leak in the gas evaporation device at any time, i.e. without any particular conditions linked to the running or static state of the engine. The invention relates in particular to a device that can detect a leak at any time and without using NVLD equipment.

To this end, the invention firstly relates to a device for evaporating vapors of a fuel stored in a motor vehicle tank, said vehicle comprising an engine and a tank for storing a fuel for burning in said engine, said evaporation device comprising:
  an absorbent filter suitable for filtering the vapors generated by the fuel stored in said tank,
  a so-called "absorption" circuit connecting the absorbent filter to the tank so as to allow the gas vapors to be conveyed to the absorbent filter,
  a so-called "ventilation" circuit connecting the outside of the vehicle to the absorbent filter comprising an outlet valve configured to switch between an open position in which the outlet valve allows the gases filtered by the absorbent filter to escape to the outside, and a closed position in which the evaporation device is isolated from the outside of the vehicle,
  a so-called "purge" circuit connecting the absorbent filter to the engine of the vehicle and comprising an electric pump, suitable for allowing the fuel vapors absorbed by the absorbent filter to flow to the engine, a pressure measurement sensor and a purge valve configured to switch between an open position, in which said purge valve allows the gases to flow from the absorbent filter to the engine, and a closed position in which the absorbent filter is isolated from the engine, said evaporation device being noteworthy in that it also comprises a bypass circuit and a bypass valve mounted between the absorption circuit, the purge circuit and the tank, which is configured to move between a so-called "absorption" position, in which the bypass valve allows the gases to flow between the tank and the absorbent filter, via the absorption circuit, and a so-called "leak detection" position, in which the bypass valve allows the gases to flow between the purge circuit and the tank via the bypass circuit, the electric pump being configured to draw in gases from the outside to convey them, via the ventilation circuit, the absorbent filter and the bypass circuit, to the tank, in order to pressurize said tank and thus allow the detection of a leak in the evaporation device by means of the pressure measurement sensor.

The term "pressurize" is given to mean increasing the pressure so that it is greater than the pressure of the tank before the leak detection test so that when the measurement of the pressure change with the pressure measurement sensor starts, any drop in pressure linked to a leak can be detected reliably.

The evaporation device according to the invention advantageously makes it possible to detect the presence of a leak at any time regardless of the running or static state of the engine. The incorporation of a bypass valve allows the use of a low-cost piece of equipment, making the device both simple and easy to maintain. The pressure measurement sensor advantageously makes it possible to both control the pressure inside the evaporation device and to detect a pressure drop synonymous with a leak when the evaporation device is placed in raised pressure conditions.

Preferably, the predetermined threshold is between 5 and 50 hPa, preferably of the order of 15 hPa. Such a threshold advantageously makes it possible to be sure that there is a leak, without the pressure variations being due to the vibrations generated by the movement of the vehicle or the running of the engine.

The evaporation device comprises a control module that is electrically connected to the measurement sensor in order to receive the pressure value measurements therefrom and configured to detect the presence of a leak when the absolute value of the change in said value of the pressure inside the evaporation device measured for a predetermined period is greater than or equal to a predetermined threshold. The control module advantageously makes it possible to measure the change in pressure on the basis of the pressure values transmitted by the pressure measurement sensor and thus to detect the presence of a leak when the pressure drops after the raising of the pressure in the evaporation device.

Advantageously, the control module is configured to determine the size of the leak detected as a function of the change in the pressure value measured by the measurement sensor, i.e. as a function of the pressure gradient, making it possible for example to anticipate the operations necessary to repair the leak. The faster the pressure drop, the larger the leak detected.

According to one aspect of the invention, the control module is configured to determine the flow rate of the leak or the dimensions of the orifice linked to the leak.

According to one feature of the invention, the control module is electrically connected to the outlet valve, the purge valve, the bypass valve and the electric pump in order to control them to their different positions.

In particular, the control module is configured to control the bypass valve so as to place it in the absorption position or in the leak detection position, depending on the desired configuration. Advantageously, the control module is configured to place the bypass valve in its leak detection position when certain leak diagnosis conditions are met (for example below a predetermined speed of the vehicle to avoid vibrations generated by the movement of the vehicle or the running of the engine interfering with the measurements of the pressure sensor, depending on the temperature and ambient pressure) in order to ensure the robustness of the leak detection and the accuracy of the estimate of the size of the leak of the diagnosis.

The control module is also particularly configured to control the electric pump so as to allow either the fuel vapors to be conveyed from the absorbent filter to the engine in order for them to be burned, or gas to be drawn in from the outside to the tank to pressurize it.

The control module is also particularly configured to control the purge valve so as to allow either the fuel vapors to be conveyed from the absorbent filter to the engine, or the evaporation device to be isolated from the engine so that the tank can be pressurized.

The control module is also particularly configured to control the outlet valve so as to allow either a stream of gas to be conveyed from the tank to the outside or from the outside to the tank, or the evaporation device to be isolated from the outside.

The invention also relates to a vehicle comprising an evaporation device as presented above.

The invention also relates to a method for detecting a leak in a device, for evaporating vapors of a fuel stored in a motor vehicle tank, said vehicle comprising an engine and a tank of fuel for burning in said engine, said method being noteworthy in that it comprises the steps of:
- placing the bypass valve in its leak detection position, the outlet valve in its open position and the purge valve in its closed position,
- activating the electric pump so as to draw in gases from the outside of the vehicle to convey them, via the ventilation circuit, the absorbent filter, the purge circuit and the bypass circuit, to the tank, in order to pressurize said tank,
- placing the outlet valve in its closed position at a first time,
- measuring the change in pressure by means of the pressure measurement sensor between the first time and a second time in order to determine a pressure difference between said first time and said second time, and
- detecting the presence of a leak when the pressure difference determined is greater than or equal to a predetermined pressure difference threshold.

Such a method allows the simple, effective detection of the presence of a leak at any time, regardless of the running or switched off state of the engine.

Preferably, the method comprises, after the step of detecting the presence of a leak, a step of determining the size of said detected leak on the basis of the pressure difference measured.

According to one aspect of the invention, the predetermined pressure difference threshold is between 5 and 50 hPa, preferably of the order of 15 hPa, in order to allow the reliable, rapid detection of a leak, particularly a leak linked to a small orifice (i.e. with a low flow rate).

Advantageously, the evaporation device comprises a control module electrically connected to the measurement sensor, in order to receive the pressure value measurements therefrom, and to the outlet valve, the purge valve, the bypass valve and the electric pump, in order to control them, the steps of the method being implemented by said control module.

BRIEF DESCRIPTION OF THE DRAWINGS

Other features and benefits of the present invention will appear in the following description of non-exhaustive examples of embodiments, with reference to the appended drawings, in which.

DETAILED DESCRIPTION OF THE PREFERRED EMBODIMENTS

Figure 1:
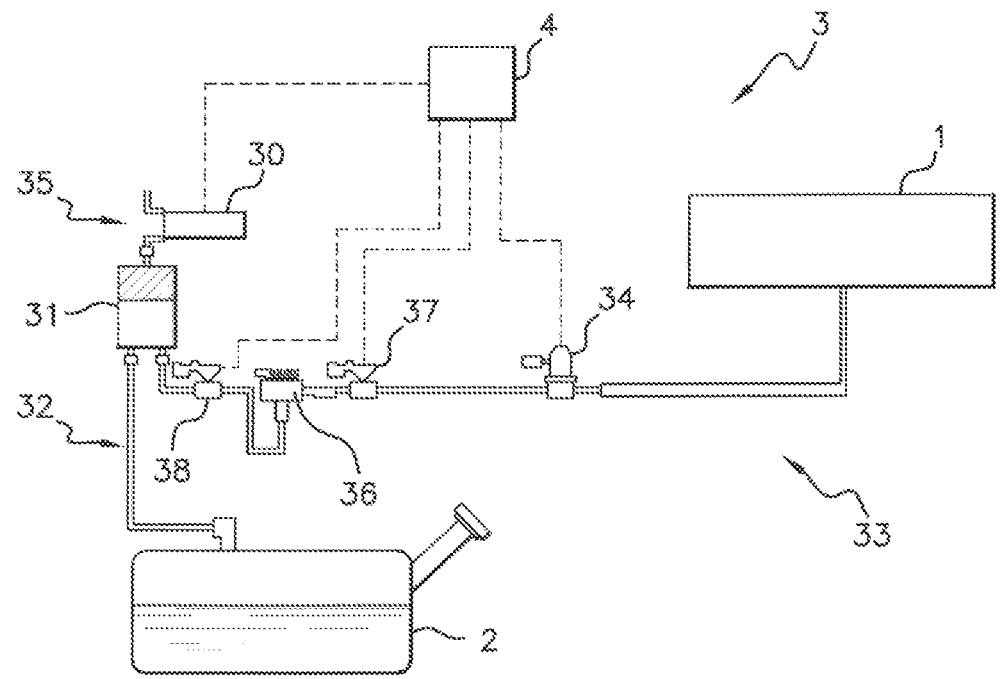
FIG. 1 schematically illustrates an evaporation device of the prior art.
Figure 2:
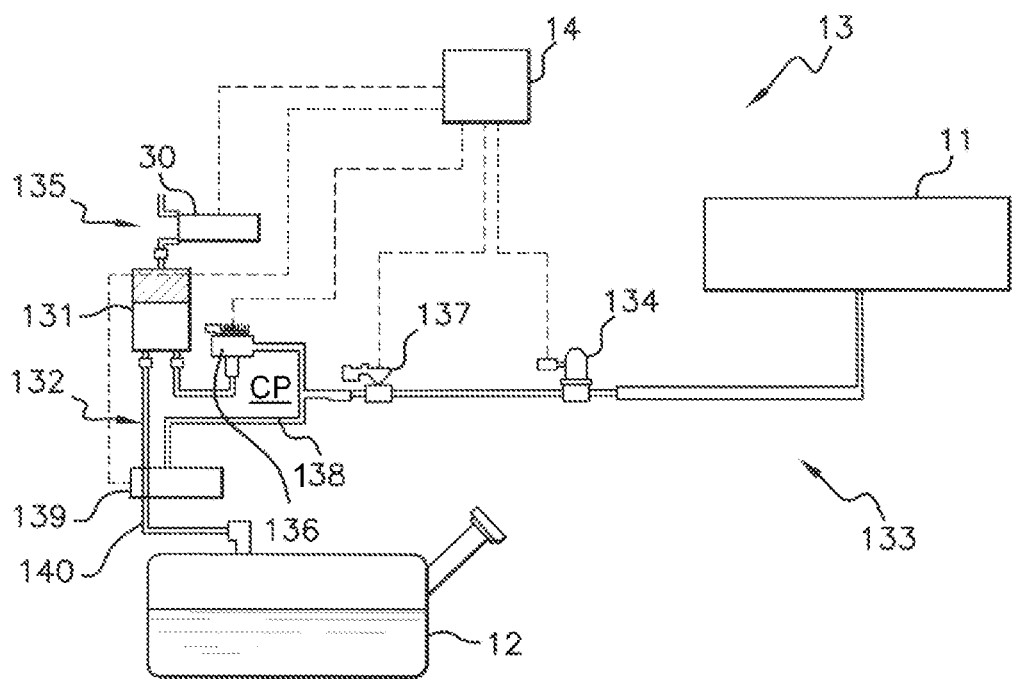
FIG. 2 schematically illustrates an evaporation device according to one embodiment of the invention, in which the bypass valve is in the absorption position.
Figure 3:
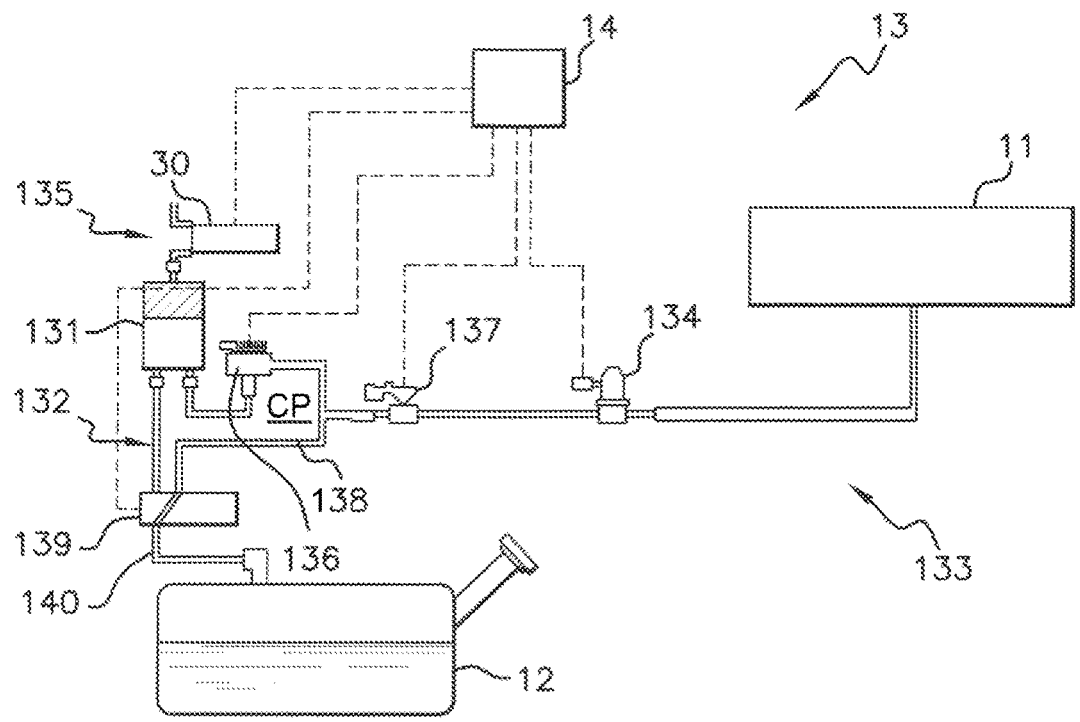
FIG. 3 is a schematic representation of the evaporation device in FIG. 2, in which the bypass valve is in the leak detection position.

FIGS. 2 and 3 show an example of an evaporation device 13 according to the invention, suitable for being installed in a motor vehicle. However, the present invention also relates any installation in a different context, in particular on any vehicle comprising an engine for which it is necessary to detect the presence of a leak of vapors of fuel stored in a tank.

As is known, a combustion engine of a motor vehicle comprises one or more hollow cylinders each delimiting a combustion chamber into which a mixture of air and fuel is injected. With reference to FIG. 2, the fuel is stored in a tank 12, from which it is drawn by an injection pump (not shown) to be conveyed to the engine 11. More specifically, the injection pump conveys the fuel into an injection rail (not shown) so as to allow the injection of the fuel into each combustion chamber.

As the pressure of the gases contained in the tank 12 must be controlled to avoid any damage or accidents and limit pollution due to the fuel vapors, the vehicle comprises an evaporation device 13, connected to the tank 12, the engine 11 and the outside of the vehicle, that makes it possible to absorb the vapors and convey them into the combustion chambers of the engine 11 so that they can be burned therein, so that the gases discharged into the atmosphere are significantly purified of the polluting components. The evaporation device 13 also makes it possible to control the presence of a leak of the fuel vapors, as will be described in greater detail hereinafter.

Still with reference to FIGS. 2 and 3, the evaporation device 13 comprises a control module 14, an outlet valve 130, an absorbent filter 131, a so-called "absorption" circuit 132, a so-called "purge" circuit 133, a purge valve 134, a so-called "ventilation" circuit 135, an electric pump 136, a pressure measurement sensor 137, a bypass circuit 138, a bypass valve 139 and a connection circuit 140.

The electric pump 136 is mounted in one portion of the purge circuit 133. The electric pump 136 operates in one direction in order to cause a stream of gas coming from the absorbent filter 131 to flow, in the portion of the purge circuit 133 in which it is mounted, to the engine 11 or the tank 12. However, when the electric pump 136 is not operating, the stream of gas can flow in two directions in order to cause the stream of gas to flow both in one direction and in the opposite direction in the portion of the purge circuit 133 in which it is mounted.

The ventilation circuit 135 connects the outside (i.e. the atmosphere) of the evaporation device 13 to the absorbent filter 131 via the outlet valve 130. The outlet valve 130 is configured to move between an open position in which the outlet valve 130 allows a stream of gas to pass from the outside to the absorbent filter 131 or from the absorbent filter 131 to the outside, and a closed position in which the outlet valve 130 prevents a stream of gas from passing from the outside to the absorbent filter 131 or from the absorbent filter 131 to the outside. In other words, the outlet valve 130 makes it possible to open or close the ventilation circuit 135 so as to isolate and seal the evaporation device 13 from the outside of the vehicle.

The absorption circuit 132 connects the absorbent filter 131 to the bypass valve 139. The purge circuit 133 connects the absorbent filter 131 to the engine 11 of the vehicle via the electric pump 136 and the purge valve 134. The bypass circuit 138 connects the bypass valve 139 to the purge circuit 133 at a connection point CP situated between the electric pump 136 and the purge valve 134. The connection circuit 140 connects the tank 12 to the bypass valve 139.

The bypass valve 139 is mounted between the absorption circuit 132, the purge circuit 133 and the connection circuit 140. The bypass valve 139 is configured to move between a so-called "absorption" position and a so-called "leak detection" position.

The absorption position of the bypass valve 139, shown in FIG. 2, corresponds to the position in which the bypass valve 139 allows gases to be conveyed from the tank 12 to the absorbent filter 131, via the absorption circuit 132, thus allowing the absorption of the fuel vapors by the absorbent filter 131. The absorbent filter 131 is configured to capture and filter the vapors generated by the fuel stored in the tank 12 in order to retain the polluting elements thereof.

The leak detection position of the bypass valve 139, shown in FIG. 3, corresponds to the position in which the bypass valve 139 allows a stream of gas coming from the outside and making it possible to pressurize the tank 12 when the purge valve 134 is closed and the outlet valve 130 is open, to be drawn in by means of the electric pump 136 and via the ventilation circuit 135, the absorbent filter 131, the purge circuit 133 and the bypass circuit 138.

The purge circuit 133 connects the absorbent filter 131 to the engine 11 of the vehicle so as to allow said absorbent filter 131 to be purged by releasing the gas vapors retained by said absorbent filter 131 and by conveying them into the combustion chambers of the engine 11 so as to allow the combustion thereof. This is achieved by actuating the electric pump 136 so that it draws in a stream of gas coming from the outside (for example air), via the ventilation circuit 135 and the absorbent filter 131, and conveys said stream, loaded with the toxic vapors stored in the absorbent filter 131, into the cylinders of the engine 11.

The different circuit portions of the evaporation device 13 preferably take the form of tubes or pipes.

The purge valve 134, mounted in the purge circuit 133 between the electric pump 136 and the engine 11, is configured to open or close said purge circuit 133. More specifically, the purge valve 134 is configured to move between a closed position in which it prevents the flow of a gaseous stream to the engine 11, and an open position in which it permits a gaseous stream to pass to the engine 11. The purge circuit 133 thus makes it possible, depending on the position of the purge valve 133, to convey the fuel vapors stored in the absorbent filter 131 to the engine 11 or to isolate the evaporation device 13 from the engine 11.

The pressure measurement sensor 137 is mounted in the purge circuit 133 between the connection point CP and the purge valve 134. The pressure measurement sensor 137 is configured to measure the pressure of the gases contained in the purge circuit 133. The measurement sensor 137 particularly makes it possible to measure the reduction in the internal pressure of the purge circuit 133 and the tank 12 following the pressurization of said tank when there is a leak in the evaporation device 13, particularly in the tank, as will be explained below.

As a variant, the pressure measurement sensor 137 could be mounted in a different place in the purge circuit 133, or in the bypass circuit 138 or in the connection circuit 140, or even in or on the tank 12 in order to measure the internal pressure thereof.

The control module 14 takes the form for example of a main computer for controlling the engine 11 of the vehicle or a dedicated microcontroller.

The control module 14 is configured to control the electric pump 136 in order to start it. More specifically, the control module 14 is configured to control the electric pump so as to allow either fuel vapors to be conveyed from the absorbent filter 131 to the engine 11 in order for them to be burned, or gas to be drawn in from the outside to the tank 12 to pressurize it.

The control module 14 is configured to control the outlet valve 130 and the purge valve 134 to their open or closed positions.

More specifically, the control module 14 is configured to control the purge valve 134 so as to allow either fuel vapors to be conveyed from the absorbent filter 131 to the engine 11, or the evaporation device 13 to be isolated from the engine 11 so that the tank 12 can be pressurized. Similarly, the control module 14 is configured to control the outlet valve 130 so as to allow a stream of gas to be conveyed from the tank 12 to the outside via the absorbent filter 131, which retains the toxic vapors therefrom, or from the outside to the tank 12 to pressurize it via the absorbent filter 131 and the purge circuit 133, or the evaporation device 13 to be isolated from the outside.

The control module 14 is configured to control the bypass valve 139 so as to place it in its absorption position or in its leak detection position, depending on the desired configuration. Advantageously, the control module 14 is configured to place the bypass valve 139 in its leak detection position when certain leak diagnosis conditions are met (for example below a predetermined speed of the vehicle to avoid vibrations generated by the movement of the vehicle or the running of the engine interfering with the measurements of the pressure sensor 137, depending on the temperature and ambient pressure) in order to ensure the robustness of the leak detection and the accuracy of the estimate of the size of the leak of the diagnosis.

The control module 14 is configured to receive from the measurement sensor 137 the pressure measurements that it takes, to analyze the change in these values, for example the gradient thereof, over a predetermined time interval, and to detect the presence of a leak when the pressure drop inside the evaporation device 13 is greater than or equal to a predetermined threshold following the pressurization of the tank 12 and when the purge valve 134 and the outlet valve 130 are in the closed position.

During a leak test, the evaporation device 13 is initially pressurized, then the pressurization is stopped and the change in internal pressure is analyzed for a predetermined period, for example 10 seconds. When the internal pressure remains substantially stable for the predetermined period, there is no leak. Conversely, when the pressure reduces and the absolute value of the pressure difference between the start and end of the predetermined period is greater than or equal to the predetermined threshold, this reveals the presence of a leak. The predetermined pressure difference threshold is advantageously between 5 and 50 hPa, and preferably of the order of 15 hPa.

The control module 14 is configured to determine the size of the leak detected as a function of the change in the pressure value measured by the measurement sensor 137, i.e. as a function of the pressure gradient, making it possible for example to anticipate the operations necessary to repair the leak. The greater and faster the pressure drop, the larger the leak detected. If there is a leak, the change in pressure can be evaluated using the pressure gradient, which can then be compared to predetermined gradient values, for example empirically predetermined, corresponding to given leak flow rates or given leak orifice sizes. In this preferred example, the control module 14 is configured to determine the flow rate of the leak or the dimensions of the orifice linked to the leak.

Figure 4:
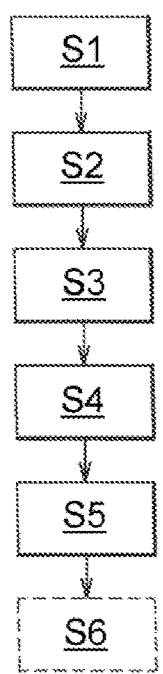
FIG. 4 schematically illustrates one embodiment of the method according to the invention.

The invention will now be described in terms of one exemplary embodiment with reference to FIG. 4. The method according to the invention makes it possible to detect the presence of a leak of fuel vapors in an evaporation device 13 as described previously.

According to a preferred embodiment, in order to allow the detection of a leak, the outlet valve 130 is initially in its open position so as to allow a stream of gas to flow into the evaporation device 13, the purge valve 134 is initially in its closed position so as to isolate the evaporation device 13 from the engine 11, and the bypass valve 139 is initially placed in its absorption position so as to allow the fuel vapors to be absorbed by the absorbent filter 131.

When it is necessary to carry out a leak detection test, the control module 14, in a step S1, places the bypass valve 139 in its leak detection position, the outlet valve 130 in its open position and the purge valve 134 in its closed position.

The control module 14 then activates the electric pump 136 in a step S2 so as to create a stream of gas from the outside to the tank 12 via the ventilation circuit 135, the absorbent filter 131, the purge circuit 133 and the connection circuit 140 and thus pressurize the tank 12.

When the pressure in the tank has reached the threshold of 15 hPa, in a step S3 the control module 14 then places the outlet valve 130 in its closed position at a first time and then in a step S4 collects the measurements of the change in pressure sent by the pressure measurement sensor 137 between the first time and a second time in order to determine a pressure difference between said first time and said second time.

In a step S5, the control module 14 then detects the presence of a leak when the absolute value of the pressure difference determined (which in this case corresponds to a pressure drop) is greater than or equal to a predetermined pressure difference threshold.

In a preferred embodiment, the control module 14 also optionally determines, in a step S6, the size of the leak detected as a function of the pressure difference calculated.

Such a method according to the invention advantageously makes it possible to detect the presence of a leak in the evaporation device simply, quickly and effectively, particularly whether the engine 11 is in a running or static state. Such a method also makes it possible to detect a leak without requiring the incorporation into the evaporation device 13 of specific NVLD equipment, thus allowing effective, low-cost leak detection.

The invention claimed is:

1. A device for evaporating vapors of a fuel stored in a motor vehicle tank of a motor vehicle including an engine, the motor vehicle tank being configured to store the fuel configured to burn in said engine, said evaporation device comprising:
   an absorbent filter configured to filter the vapors generated by the fuel stored in said tank;
   a absorption circuit connecting the absorbent filter to the tank to allow the vapors to be conveyed to the absorbent filter;
   a ventilation circuit connecting the outside of the motor vehicle to the absorbent filter, the ventilation circuit comprising an outlet valve configured to switch between an open position in which the outlet valve allows gases filtered by the absorbent filter to escape to the outside, and a closed position in which the evaporation device is isolated from the outside of the motor vehicle;
   a purge circuit connecting the absorbent filter to the engine of the motor vehicle, the purge circuit comprising
      an electric pump configured to allow the vapors absorbed by the absorbent filter to flow to the engine,
      a purge valve configured to switch between an open position, in which said purge valve allows the gases to flow from the absorbent filter to the engine, and a closed position in which the absorbent filter is isolated from the engine, and
      a pressure measurement sensor mounted between a connection point with the electric pump, and the purge valve;
   a bypass circuit; and
   a bypass valve mounted between the absorption circuit, the purge circuit, and the tank, the bypass valve being connected to the purge circuit by the bypass circuit at the connection point, the bypass valve being configured to move between an absorption position, in which the bypass valve allows the gases to flow between the tank and the absorbent filter via the absorption circuit, and a leak detection position, in which the bypass valve allows the gases to flow between the purge circuit and the tank via the bypass circuit,
   wherein the electric pump is configured to draw in gases from the outside to convey the outside gases, via the ventilation circuit, the absorbent filter, and the bypass circuit, to the tank, in order to pressurize said tank and allow the detection of a leak in the evaporation device by the pressure measurement sensor.

2. The evaporation device as claimed in claim 1, further comprising a controller that is electrically connected to the measurement sensor in order to receive the pressure value measurements therefrom, the controller being configured to detect a presence of the leak when the absolute value of the change in said value of the pressure inside the evaporation device measured for a predetermined period is greater than or equal to a predetermined threshold.

3. The evaporation device as claimed in claim 2, wherein the controller is further configured to determine the size of the leak detected as a function of the change in the value of the pressure measured by the measurement sensor.

4. The evaporation device as claimed in claim 3, wherein the controller is configured to determine the flow rate of the leak or a size of the orifice linked to the leak.

5. The evaporation device as claimed in claim 2, wherein the controller is configured to control the outlet valve, the purge valve, the bypass valve, and the electric pump so that the outlet valve, the purge valve, and the bypass valve switch to respective different positions.

6. A vehicle comprising:
   the evaporation device as claimed in claim 1.

7. A method for detecting a leak in the evaporation device as claimed in claim 1 for evaporating vapors of the fuel stored in the motor vehicle tank of said motor vehicle including an engine, the tank being configured to store fuel configured to burn in said engine, said method comprising:
   placing the bypass valve in the leak detection position, the outlet valve in the open position, and the purge valve in the closed position;
   activating the electric pump to draw in the gases from the outside of the motor vehicle to convey the outside gases, via the ventilation circuit, the absorbent filter, the purge circuit, and the bypass circuit, to the tank, in order to pressurize said tank;

placing the outlet valve in the closed position at a first time;

measuring the change in pressure by the pressure measurement sensor between the first time and a second time in order to determine a pressure difference between said first time and said second time; and detecting a presence of the leak when the pressure difference determined is greater than or equal to a predetermined pressure difference threshold.

8. The detection method as claimed in claim 7, further comprising, after the detecting the presence of the leak, a step (S10) of determining the size of said detected leak based on the pressure difference measured.

9. The detection method as claimed in claim 7, wherein the predetermined pressure difference threshold is between 5 and 50 hPa.

10. The detection method as claimed in claim 7, wherein the evaporation device comprises a controller electrically connected to the measurement sensor, in order to receive the pressure value measurements therefrom, and to the outlet valve, the purge valve, the bypass valve and the electric pump, in order to control the outlet valve, the purge valve, the bypass valve, and the electric pump, the detection method being implemented by said controller.

11. The evaporation device as claimed in claim 3, wherein the controller is configured to control the outlet valve, the purge valve, the bypass valve, and the electric pump so that the outlet valve, the purge valve, and the bypass valve switch to respective different positions.

12. The evaporation device as claimed in claim 4, wherein the controller is configured to control the outlet valve, the purge valve, the bypass valve, and the electric pump so that the outlet valve, the purge valve, and the bypass valve switch to respective different positions.

13. A vehicle comprising:
the evaporation device as claimed in claim 2.

14. A vehicle comprising:
the evaporation device as claimed in claim 3.

15. A vehicle comprising:
the evaporation device as claimed in claim 4.

16. A vehicle comprising:
the evaporation device as claimed in claim 5.

17. A method for detecting a leak in the evaporation device as claimed in claim 2 for evaporating vapors of the fuel stored in the motor vehicle tank of said motor vehicle including an engine, the tank being configured to store fuel configured to burn in said engine, said method comprising:
placing the bypass valve in the leak detection position, the outlet valve in the open position, and the purge valve in the closed position;
activating the electric pump to draw in the gases from the outside of the motor vehicle to convey the outside gases, via the ventilation circuit, the absorbent filter, the purge circuit, and the bypass circuit, to the tank, in order to pressurize said tank;
placing the outlet valve in the closed position at a first time;
measuring the change in pressure by the pressure measurement sensor between the first time and a second time in order to determine a pressure difference between said first time and said second time; and
detecting a presence of the leak when the pressure difference determined is greater than or equal to a predetermined pressure difference threshold.

18. A method for detecting a leak in the evaporation device as claimed in claim 3 for evaporating vapors of the fuel stored in the motor vehicle tank of said motor vehicle including an engine, the tank being configured to store fuel configured to burn in said engine, said method comprising:
placing the bypass valve in the leak detection position, the outlet valve in the open position, and the purge valve in the closed position;
activating the electric pump to draw in the gases from the outside of the motor vehicle to convey the outside gases, via the ventilation circuit, the absorbent filter, the purge circuit, and the bypass circuit, to the tank, in order to pressurize said tank;
placing the outlet valve in the closed position at a first time;
measuring the change in pressure by the pressure measurement sensor between the first time and a second time in order to determine a pressure difference between said first time and said second time; and
detecting a presence of the leak when the pressure difference determined is greater than or equal to a predetermined pressure difference threshold.

19. A method for detecting a leak in the evaporation device as claimed in claim 4 for evaporating vapors of the fuel stored in the motor vehicle tank of said motor vehicle including an engine, the tank being configured to store fuel configured to burn in said engine, said method comprising:
placing the bypass valve in the leak detection position, the outlet valve in the open position, and the purge valve in the closed position;
activating the electric pump to draw in the gases from the outside of the motor vehicle to convey the outside gases, via the ventilation circuit, the absorbent filter, the purge circuit, and the bypass circuit, to the tank, in order to pressurize said tank;
placing the outlet valve in the closed position at a first time;
measuring the change in pressure by the pressure measurement sensor between the first time and a second time in order to determine a pressure difference between said first time and said second time; and
detecting a presence of the leak when the pressure difference determined is greater than or equal to a predetermined pressure difference threshold.

20. A method for detecting a leak in the evaporation device as claimed in claim 5 for evaporating vapors of the fuel stored in the motor vehicle tank of said motor vehicle including an engine, the tank being configured to store fuel configured to burn in said engine, said method comprising:
placing the bypass valve in the leak detection position, the outlet valve in the open position, and the purge valve in the closed position;
activating the electric pump to draw in the gases from the outside of the motor vehicle to convey the outside gases, via the ventilation circuit, the absorbent filter, the purge circuit, and the bypass circuit, to the tank, in order to pressurize said tank;
placing the outlet valve in the closed position at a first time;
measuring the change in pressure by the pressure measurement sensor between the first time and a second time in order to determine a pressure difference between said first time and said second time; and
detecting a presence of the leak when the pressure difference determined is greater than or equal to a predetermined pressure difference threshold.

* * * * *